(12) United States Patent
Wu et al.

(10) Patent No.: US 11,954,332 B2
(45) Date of Patent: Apr. 9, 2024

(54) DATA PROCESSING METHOD, CONTROLLER, STORAGE DEVICE, AND STORAGE SYSTEM

(71) Applicant: Huawei Technologies Co., Ltd., Shenzhen (CN)

(72) Inventors: Liming Wu, Chengdu (CN); Guoxia Liu, Chengdu (CN); Jizhuo Tang, Chengdu (CN); Po Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 17/347,041

(22) Filed: Jun. 14, 2021

(65) Prior Publication Data

US 2021/0303173 A1   Sep. 30, 2021

Related U.S. Application Data

(63) Continuation of application No. PCT/CN2019/081221, filed on Apr. 3, 2019.

(30) Foreign Application Priority Data

Dec. 16, 2018   (CN) .......................... 201811538076.4
Dec. 21, 2018   (CN) .......................... 201811571773.X

(51) Int. Cl.
   *G06F 3/06* (2006.01)
(52) U.S. Cl.
   CPC ............ *G06F 3/0611* (2013.01); *G06F 3/064* (2013.01); *G06F 3/0659* (2013.01); *G06F 3/0673* (2013.01)
(58) Field of Classification Search
   CPC ...... G06F 3/064; G06F 3/0659; G06F 3/0673; G06F 3/0611

(Continued)

(56) References Cited

U.S. PATENT DOCUMENTS 10,175,891 B1 *   1/2019   Malwankar ............ G06F 3/0611
10,445,229 B1 *   10/2019   Kuzmin ................. G06F 8/654

(Continued)

FOREIGN PATENT DOCUMENTS

CN   101162608 A   4/2008
CN   102185874 A   9/2011

(Continued)

OTHER PUBLICATIONS

Cui et al., "Exploiting Latency Variation for Access Conflict Reduction of NAND Flash Memory," 2016 32nd Symposium on Mass Storage Systems and Technologies (MSST), IEEE, XP03308503, total 8 pages, Institute of Electrical and Electronics, Engineers, New York, New York (May 2, 2016). XP033085030.

(Continued)

*Primary Examiner* — Gautam Sain
(74) *Attorney, Agent, or Firm* — Leydig, Voit & Mayer, Ltd.

(57) ABSTRACT

Embodiments of the present disclosure provide a data processing method, a controller, a storage device, and a storage system. The controller adds an execution time of an IO request to the IO request, and the execution time is used to instruct the storage device to complete the IO request before the execution time expires. The controller sends, to the storage device, the IO request to which the execution time is added. When receiving the IO request, the storage device can execute the IO request based on the execution time of the IO request.

13 Claims, 11 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2004/0268177 A1* | 12/2004 | Ji ........................ | G06F 11/2028 714/5.11 |
| 2008/0320241 A1 | 12/2008 | Dees et al. | |
| 2010/0011149 A1 | 1/2010 | Molaro et al. | |
| 2013/0013827 A1 | 1/2013 | Liu et al. | |
| 2014/0351747 A1 | 11/2014 | Kayoiji | |
| 2015/0220278 A1* | 8/2015 | Sarcone ................ | G06F 3/0659 711/103 |
| 2016/0210050 A1* | 7/2016 | Hyun .................... | G06F 3/0611 |
| 2017/0177221 A1* | 6/2017 | Trehan .................... | H04L 67/61 |
| 2017/0353577 A1* | 12/2017 | Lutz .................... | H04L 67/5682 |

FOREIGN PATENT DOCUMENTS

| | | | |
|---|---|---|---|
| CN | 102843366 | A | 12/2012 |
| CN | 103425587 | A | 12/2013 |
| CN | 106598878 | A | 4/2017 |
| CN | 106998317 | A | 8/2017 |
| CN | 107305473 | A | 10/2017 |
| IN | 105677744 | A | 6/2016 |

OTHER PUBLICATIONS

Organization Dell Computer Corporation, "High Speed serialized at attachment Serial ATA International Organization Serial ATA Revision 3.0-Gold Revision Serial ATA International Organization: Serial ATA Revision 3.0," XP055866288, total 18 pages (Jun. 2, 2009). Organization.

* cited by examiner

| | | Byte 3 | Byte 2 | Byte 1 | | Byte 0 |
|---|---|---|---|---|---|---|
| | | 24 to 31 | 16 to 23 | 8 to 15 | | 0 to 7 |
| Dword (command line) | 0 | XXXX | | XXXXX | 0/1 | Opcode (command identifier) |
| | 1 | Namespace Identifier (namespace identifier) | | | | |
| | 2 | Deadline (execution time) | | | | |
| | 3 | | | | | |
| | 4 | Metadata Pointer (metadata pointer) | | | | |
| | 5 | | | | | |
| | 6 | | | | | |
| | 7 | Data Pointer (memory address used when a pointing disk returns data) | | | | |
| | 8 | | | | | |
| | 9 | | | | | |
| | 10 | Starting LBA (starting LBA) | | | | |
| | 11 | | | | | |
| | 12 | XXXX | | | | |
| | 13 | | | | | |
| | 14 | XXXX | | | | |
| | 15 | XXXX | | XXXX | | |

FIG. 12

DATA PROCESSING METHOD, CONTROLLER, STORAGE DEVICE, AND STORAGE SYSTEM

CROSS-REFERENCE IO RELATED APPLICATIONS

This application is a continuation of International Application No. PCT/CN2019/081221, filed on Apr. 3, 2019, which claims priority to Chinese Patent Application No. 201811571773.X, filed on Dec. 21, 2018, and Chinese Patent Application No. 201811538076.4, filed on Dec. 16, 2018, all of which are hereby incorporated by reference in their entireties.

TECHNICAL FIELD

This application relates to the storage field, and in particular, to a method for processing data stored in a storage device, a controller, a storage device, and a storage system.

BACKGROUND

In a related art, for input/output (TO) requests accessing a same die in a solid-state drive (SSD), the SSD executes the IO requests according to an order in which the IO requests reach the die. If a block in the die needs to be erased, an erasure request for erasing the block is added to a queue of to-be-processed requests that corresponds to the die. For example, if a write request and the erase request are sorted before a read request in the queue of the to-be-processed requests, the SSD first executes a write operation corresponding to the write request, then executes an erase operation corresponding to the erasure request, and finally executes a read operation corresponding to the read request. However, each of a time consumed by the write operation and a time consumed by the erase operation is far longer than that consumed by the read operation. In this way, an emergency read request can be executed only after execution of a previous write request or erasure request is completed. Consequently, a delay of the read operation is easily caused. In addition, some operations corresponding to IO requests generated through the operations such as garbage collection and preventive maintenance in the SSD consume a longer time, thereby leading to greater impact on a delay of another relatively emergency IO request, for example, a read request.

SUMMARY

The present disclosure provides a data processing method, a controller, a storage device, and a storage system. An execution time is added to an IO request, so that the storage device executes the IO request based on the execution time in the IO request when executing the IO request. Therefore, an emergency IO request is processed in time.

According to a first aspect of the present disclosure, a data processing method is provided, where the method is performed by a controller, and the controller communicates with a storage device. The controller and the storage device may be a memory and a storage device that are in a storage array, or may be a memory and a storage device that are in a server. When performing the method, the controller adds an execution time of an IO request to the IO request, and then sends the IO request to the storage device, where the execution time is used to instruct the storage device to complete processing the IO request before the execution time expires.

The execution time is added to the IO request, so that the storage device executes the IO request based on the execution time in the IO request when executing the IO request. Therefore, an emergency IO request is processed in time.

In an optional embodiment of the first aspect, the controller further adds a timeout indication mark to the IO request. The timeout indication mark is used to indicate whether the storage device returns a mark of error information when processing the IO request is not completed by the storage device when the execution time times out, and the error information is used to indicate that the IO request is incorrectly executed.

In this way, when the IO request is not completed within the execution time in the IO request, the controller may be informed in time to determine, in time, a new policy on processing the IO request, for example, performing re-reading or writing to a new location.

In an optional embodiment of the first aspect, the controller may determine a type of the IO request, such as an externally generated IO request, an IO request corresponding to an internal key service, or an IO request corresponding to an array background service, and then determine the execution time of the IO request based on the determined type of the IO request.

Different execution times are set for different types of IO requests, so that an IO request needing to be urgently processed may be preferentially processed.

In a first optional embodiment of the first aspect, the controller presets different execution duration for each type of IO request, and then, when the execution time is set for the received IO request, a current time and the execution duration that is set for the type to which the IO request belongs are added, so that the storage device may execute the IO request based on the execution time of the IO request.

According to a second aspect of the present disclosure, a data processing method is provided, where the method is performed by a storage device. After the storage device obtains an IO request, because the IO request includes an execution time, and the execution time is used to instruct the storage device to complete processing the IO request before the execution time expires, the storage device may execute the IO request based on the execution time of the IO request.

The execution time is added to the IO request, so that the storage device executes the IO request based on the execution time in the IO request when executing the IO request. Therefore, an emergency IO request is processed in time.

In an optional embodiment of the second aspect, the storage device includes a plurality of storage blocks. After obtaining the IO request, the storage device determines a storage block accessed by the IO request; then places, based on the execution time, the IO request in a queue of to-be-processed requests that corresponds to the storage block; and executes the IO request based on the execution time of the IO request in the queue.

A queue of to-be-processed requests is set for each storage block, so that a storage array may conveniently manage the to-be-processed requests based on the execution time of the IO request.

In an optional embodiment of the second aspect, the storage device includes a plurality of storage areas, each storage area includes at least one storage block, the IO request is a write request, and when determining a storage block accessed by the IO request, the storage device first selects a storage area in which no erase operation is performed from the plurality of storage areas, and then determines, based on the selected storage area, the storage block accessed by the IO request.

Because each of a write request and an erasure request has a relatively long execution time, the write request and the erasure request may be respectively executed in different storage areas in the foregoing manner, so that a probability that an emergency IO request is processed in time can be increased.

In an optional embodiment of the second aspect, each storage block includes a plurality of sub-blocks, the sub-block is a minimum unit on which the erase operation is performed, each storage area includes two modes: a read+write mode and a read+erase mode, and when the storage area is used to write data, the storage area is set to the read+write mode; and when the storage area is used to perform the erase operation, the storage area is set to the read+erase mode. When selecting the storage area in which no erase operation is currently performed from the plurality of storage areas, the storage block first selects a storage area in the read+write mode from the plurality of storage areas; determines whether a quantity of idle sub-blocks in the selected storage area is less than a threshold; when the quantity of idle sub-blocks in the selected storage area is less than the threshold, sets a mode of the storage area to the read+erase mode; determines whether a storage area that is not in the read+write mode or the read+erase mode exists; and when the storage area that is not in the read+write mode or the read+erase mode exists, uses the storage area that is not in the read+write mode or the read+erase mode as the storage area in which no erase operation is performed. When the quantity of idle sub-blocks in the selected storage area is not less than the threshold, the selected storage area in the read+write mode is used as the storage area in which no erase operation is performed.

In this way, when the storage device selects the storage area in which no erase operation is currently performed, if the quantity of idle sub-blocks in the selected storage device is less than the threshold, it indicates that space for writing data may be excessively less in the storage area, and write efficiency is affected. In this way, the storage area may be erased for later use, and a new storage area is re-selected for the IO request.

In another optional embodiment of the second aspect, when selecting the storage area in which no erase operation is currently performed from the plurality of storage areas, the storage device first selects a storage area in the read+write mode from the plurality of storage areas; determines whether read and write pressure undertaken by the selected storage area exceeds a threshold; when the read and write pressure undertaken by the selected storage area exceeds the threshold, determines whether a storage area that is not in the read+write mode or the read+erase mode exists; and when the storage area that is not in the read+write mode or the read+erase mode exists, selects the storage area that is not in the read+write mode or the read+erase mode as the storage area in which no erase operation is performed. However, when the read and write pressure undertaken by the selected storage area does not exceed the threshold, the selected storage area is used as the storage area in which no erase operation is performed.

When a storage area is to be selected, whether the read and write pressure exceeds the threshold is determined, so that a storage area with relatively low read and write pressure is selected for data writing. In this way, writing data to a storage area with relatively high read and write pressure is avoided, thereby avoiding impact on write efficiency.

In an optional embodiment of the second aspect, the storage area further includes a read+write+erase mode, and in the read+write+erase mode, a read operation, a write operation, and an erase operation are capable of being executed in the storage area. When the storage area in the read+write mode and the read+erase mode exist, the storage device converts all modes of the plurality of storage areas into the read+write+erase mode.

Reading, writing, and erasure may be performed while a mode of a storage area is converted, thereby avoiding a case in which the storage device cannot normally write data when failing to find a proper storage area for the IO request.

In an optional embodiment of the second aspect of the present disclosure, each storage block includes a plurality of sub-blocks, the sub-block is a minimum unit on which the erase operation is performed, each storage area includes two modes: a read+write mode and a read+erase mode, and when the storage area is used to write data, the storage area is set to the read+write mode; and when the storage area is used to perform the erase operation, the storage area is set to the read+erase mode. The storage device performs the following method to select a storage area to which to-be-written data is written: first selecting a storage area in the read+write mode, and determining whether a quantity of idle sub-blocks in the selected storage area is less than a threshold; and if the quantity of idle sub-blocks in the selected storage area is less than the threshold, converting a mode of the storage area into the read+erase mode; determining whether a storage area that is not in the read+write mode or the read+erase mode exists in storage areas of an SSD; and if there is the storage area that is not in the read+write mode or the read+erase mode, using the storage area as the storage area in which no erase operation is performed; or if there is a storage area that is in the read+write mode and the read+erase mode, the disk processor 1021 converts all the storage areas in the SSD into the read+write+erase mode; or if it is determined that the quantity of idle sub-blocks in the selected storage area is not less than the threshold, determining whether read and write pressure of the storage area currently in the read+write mode is excessively high; and if the pressure of the storage area currently in the read+write mode is not high, determining the storage area is a storage area to which the write request is written; or if the pressure of the storage area currently in the read+write mode is excessively high, the disk processor 1021 converts all the storage areas in the SSD into the read+write+erase mode.

In an optional embodiment of the second aspect, a queue of to-be-processed requests that corresponds to each storage block is a linked list group. In addition, each storage block corresponds to a read linked list group and a write linked list group, the read linked list group is used to mount a read request based on an execution time of the read request in the IO request, and the write linked list group is used to mount a write request based on an execution time of the write request in the IO request.

The read request and the write request are mounted in different linked lists, so that efficiency of scheduling and executing the IO request can be improved.

In an optional embodiment of the second aspect, each of the read linked list group and the write linked list group includes a plurality of linked lists, each linked list indicates a time range, time ranges of two adjacent linked lists are consecutive, and the storage device determines a time range to which the execution time of the read request or the execution time of the write request belongs; and mounts the read request or the write request in a linked list corresponding to the time range.

A plurality of time ranges are obtained through division, and the IO request is mounted in a linked list corresponding to a time range within which the execution time falls, so that a speed of searching the IO request can be increased, thereby increasing efficiency of scheduling and executing the IO request.

In an optional embodiment of the second aspect, the storage area further includes at least one disk-level linked list group, a linked list group corresponding to the storage block is a block-level linked list group, each disk-level linked list group includes a plurality of disk-level linked lists, each disk-level linked list indicates a time range, the time range is a current time plus preset duration, time ranges of two adjacent disk-level linked lists are consecutive, the at least one disk-level linked list group and the block-level linked list group constitute different levels, the block-level linked list group is a linked list group at a lowest level, and a sum of time ranges indicated by all linked lists in a linked list group at a next level is a time range indicated by a first linked list in a linked list group at a previous level.

A plurality of linked lists at a plurality of levels are obtained through division, so that a length of an entire linked list may be reduced, time precision indicated by the linked list is increased, and efficiency of scheduling and executing the IO request is increased.

In an optional embodiment of the second aspect of the present disclosure, the storage device fragments, into a plurality of fragments, the write request or the erasure request needing to be executed; after completing executing one fragment, determines whether an emergency read request needs to be processed, where the emergency read request is a read request whose execution time is earlier than an execution time of the write request or an execution time of the erasure request; and if the emergency read request needs to be processed, pauses executing the write request or the erasure request, and executes the emergency read request.

In an optional embodiment of the second aspect of the present disclosure, the storage device fragments, into a plurality of fragments, the write request or the erasure request needing to be executed; after completing executing one fragment, determines whether an emergency read request needs to be processed, where the emergency read request is a read request whose execution time is earlier than a current time plus execution duration of a next fragment plus execution duration of the read request; and if the emergency read request needs to be processed, pauses executing the write request or the erasure request, and executes the emergency read request.

In an optional embodiment of the second aspect of the present disclosure, the storage device fragments, into a plurality of fragments, the write request or the erasure request needing to be executed; after completing executing one fragment, determines whether an emergency read request needs to be processed, where the execution time of the read request is earlier than an execution time of a next fragment plus execution duration of x serially executed read requests, and x is a maximum quantity of read requests on which serial execution is allowed when executing the write request or the erasure request is paused once; and if the emergency read request needs to be processed, pauses executing the write request or the erasure request, and executes the emergency read request.

The write request or the erasure request is fragmented, and every time executing one fragment is completed, whether an emergency IO request needs to be processed is checked. If the emergency IO request needs to be processed, an emergency read IO request is executed. In this way, a case in which the emergency read IO request is not processed in time when the write request and/or the erasure request that takes a long time is executed is avoided.

According to a third aspect of the present disclosure, a data processing method is provided, applied to a storage device, where the storage device includes a plurality of storage areas. The storage device receives a write request, where the write request carries to-be-written data, and then selects a storage area in which no erase operation is performed from the plurality of storage areas; and writes the to-be-written data to the selected storage area.

Because each of the write request and an erasure request has a relatively long execution time, the write request and the erasure request may be respectively executed in different storage areas in the foregoing manner, so that a probability that an emergency IO request is processed in time can be increased.

In an optional embodiment of a third aspect, the storage device includes a plurality of storage areas, each storage area includes at least one storage block, the IO request is the write request, and when determining a storage block accessed by the IO request, the storage device first selects the storage area in which no erase operation is performed from the plurality of storage areas, and then determines, based on the selected storage area, the storage block accessed by the IO request.

Because each of the write request and the erasure request has a relatively long execution time, the write request and the erasure request may be respectively executed in different storage areas in the foregoing manner, so that a probability that an emergency IO request is processed in time can be increased.

In an optional embodiment of the third aspect, each storage block includes a plurality of sub-blocks, the sub-block is a minimum unit on which the erase operation is performed, each storage area includes two modes: a read+write mode and a read+erase mode, and when the storage area is used to write data, the storage area is set to the read+write mode; and when the storage area is used to perform the erase operation, the storage area is set to the read+erase mode. When selecting the storage area in which no erase operation is currently performed from the plurality of storage areas, the storage block first selects a storage area in the read+write mode from the plurality of storage areas; determines whether a quantity of idle sub-blocks in the selected storage area is less than a threshold; when the quantity of idle sub-blocks in the selected storage area is less than the threshold, sets a mode of the storage area to the read+erase mode; determines whether a storage area that is not in the read+write mode or the read+erase mode exists; and when the storage area that is not in the read+write mode or the read+erase mode exists, uses the storage area that is not in the read+write mode or the read+erase mode as the storage area in which no erase operation is performed. When the quantity of idle sub-blocks in the selected storage area is not less than the threshold, the selected storage area in the read+write mode is used as the storage area in which no erase operation is performed.

In this way, when the storage device selects the storage area in which no erase operation is currently performed, if the quantity of idle sub-blocks in the selected storage device is less than the threshold, it indicates that space for writing data may be excessively less in the storage area, and write efficiency is affected. In this way, the storage area may be erased for later use, and a new storage area is re-selected for the IO request.

In another optional embodiment of the third aspect, when selecting the storage area in which no erase operation is currently performed from the plurality of storage areas, the storage device first selects a storage area in the read+write mode from the plurality of storage areas; determines whether read and write pressure undertaken by the selected storage area exceeds a threshold; when the read and write pressure undertaken by the selected storage area exceeds the threshold, determines whether a storage area that is not in the read+write mode or the read+erase mode exists; and when the storage area that is not in the read+write mode or the read+erase mode exists, selects the storage area that is not in the read+write mode or the read+erase mode as the storage area in which no erase operation is performed. However, when the read and write pressure undertaken by the selected storage area does not exceed the threshold, the selected storage area is used as the storage area in which no erase operation is performed.

When a storage area is to be selected, whether the read and write pressure exceeds the threshold is determined, so that a storage area with relatively low read and write pressure is selected for data writing. In this way, writing data to a storage area with relatively high read and write pressure is avoided, thereby avoiding impact on write efficiency.

In an optional embodiment of the third aspect, the storage area further includes a read+write+erase mode, and in the read+write+erase mode, a read operation, a write operation, and an erase operation are capable of being executed in the storage area. When the storage areas in the read+write mode and the read+erase mode exist, the storage device converts all modes of the plurality of storage areas into the read+write+erase mode.

Reading, writing, and erasure may be performed while a mode of a storage area is converted, thereby avoiding a case in which the storage device cannot normally write data when failing to find a proper storage area for IO.

In an optional embodiment of the third aspect, the storage device further receives a read request, where each of the read request and the write request includes an execution time, and the execution time is used to instruct the storage device to process the read request or the write request before the execution time expires; and executes the read request or the write request based on the execution time of the read request or the execution time of the write request.

According to a fourth aspect of the present disclosure, a controller is provided, where the controller includes a plurality of function modules, and a function executed by each function module is the same as the function executed in each step in the data processing method provided in the first aspect.

According to a fifth aspect of the present disclosure, a storage device is provided, where the storage device includes a plurality of function modules, and a function executed by each function module is the same as the function executed in each step in the data processing method provided in the second aspect.

According to a sixth aspect of the present disclosure, a storage device is provided, where the storage device includes a plurality of function modules, and a function executed by each function module is the same as the function executed in each step in the data processing method provided in the third aspect.

According to a seventh aspect of the present disclosure, a data processing system is provided, including various controllers provided in the first aspect and various storage devices provided in the second aspect.

According to an eighth aspect of the present disclosure, a controller is provided, where the controller includes a processor and a storage unit, the storage unit stores a program instruction, and the processor executes the program instruction in the storage unit to perform the data processing method provided in the first aspect.

According to an eighth aspect of the present disclosure, a storage device is provided, where the storage device includes a processor and a storage unit, the storage unit stores a program instruction, and the processor executes the program instruction in the storage unit to perform the data processing method provided in the second aspect or the third aspect.

According to a ninth aspect, a storage medium is provided, where the storage medium stores computer program code, and when the computer program code is run on a computer, the computer is enabled to perform the method in the first aspect, the second aspect, or the third aspect.

BRIEF DESCRIPTION OF DRAWINGS

To describe the technical solutions in the embodiments of the present disclosure more clearly, the following briefly describes the accompanying drawings required for describing the embodiments or the prior art.

FIG. 12 is a schematic diagram of a read IO request according to an embodiment of the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are merely some rather than all of the embodiments of the present disclosure.

Figure 1:
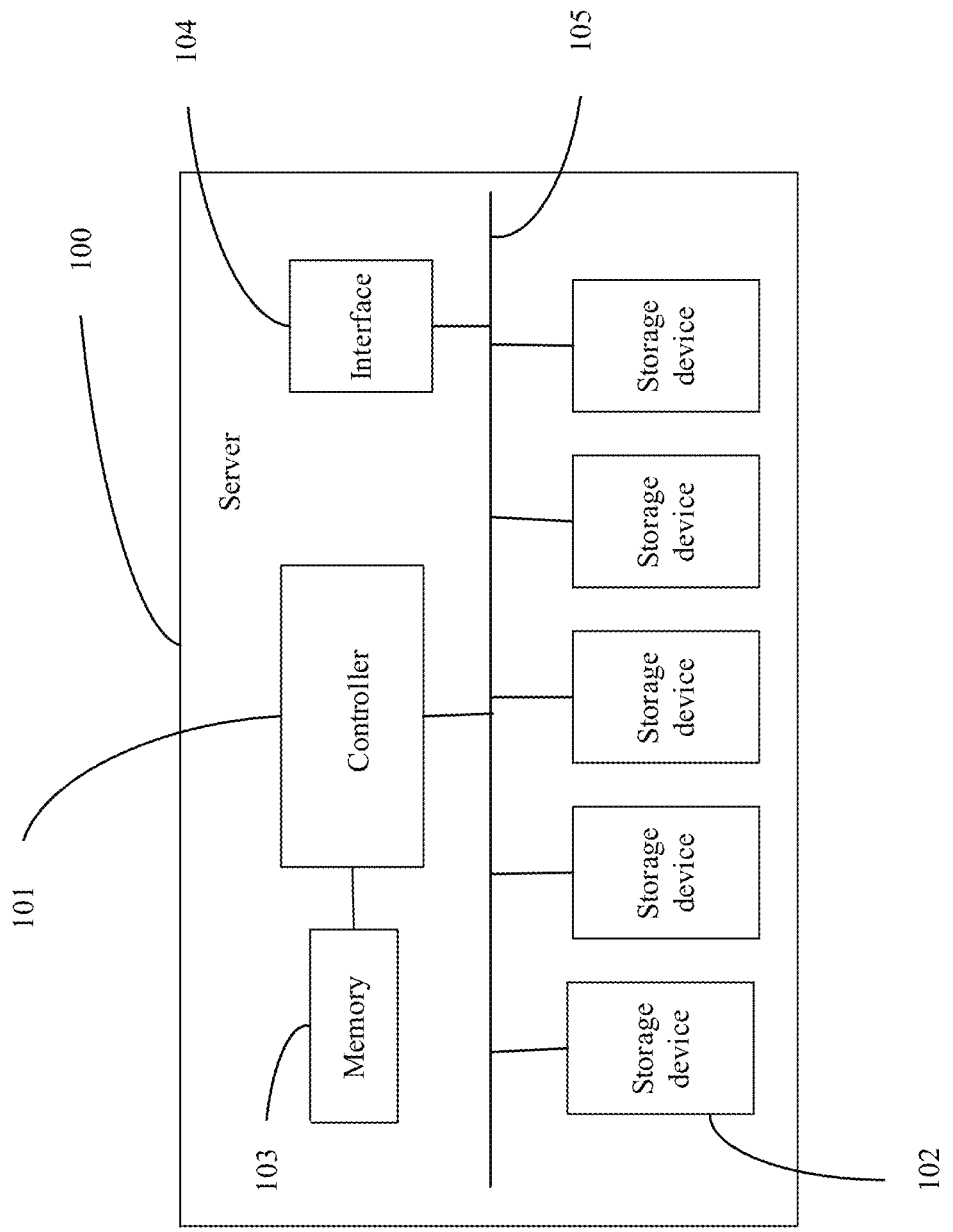
FIG. 1 is a diagram of a hardware structure of a server according to an embodiment of the present disclosure.

FIG. 1 is a diagram of a hardware structure of a server 100 according to an embodiment of the present disclosure. The server 100 includes a controller 101, a plurality of storage devices 102, a memory 103, an interface 104, and a bus 105. The controller 101, the storage device 102, and the interface 104 are connected to the bus 105, and the controller 101 accesses the storage device 102 by using the bus 105. The interface 104 is configured to: connect to a host (not shown in the figure), and transmit, to the controller 101 for processing, an IO request received from the host. The memory 103 includes an application program (not shown in the figure) run by the controller 101. By running the application program, the controller 101 may manage the storage devices 102, or may enable the server 100 to provide a service to the outside. In this embodiment of the present disclosure, the server 100 may be a storage array, or the storage device 102 may be an SSD.

Figure 2:
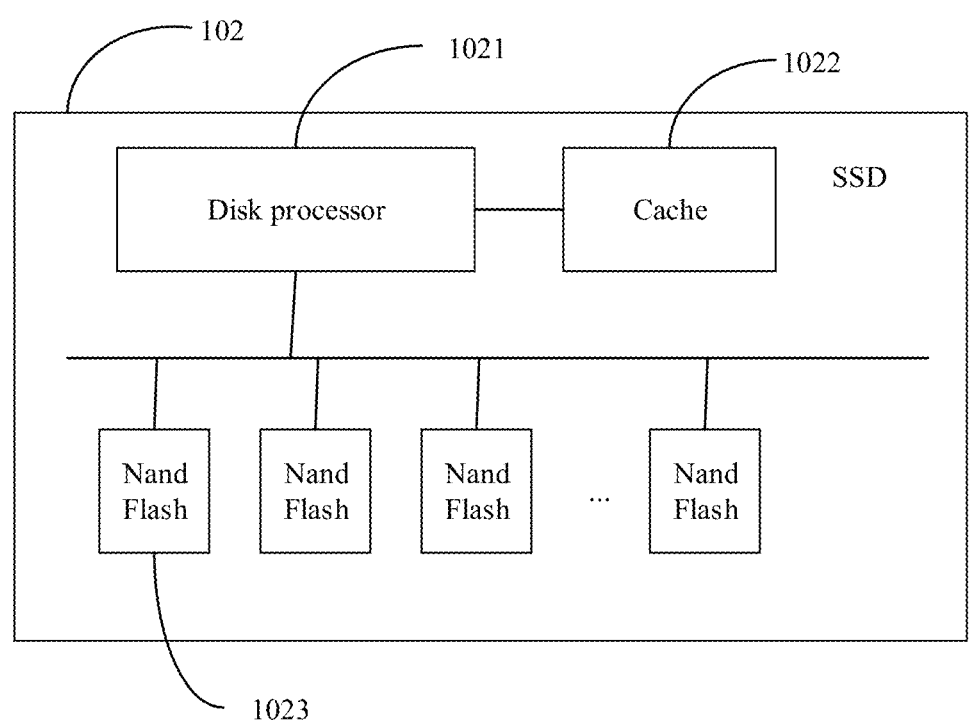
FIG. 2 is a diagram of a hardware structure of a storage device according to an embodiment of the present disclosure.

FIG. 2 is a structural diagram of a storage device 102 in a server 100. Structures of storage devices 102 in the server 100 are the same, and one of the structures is used as an example below for description.

Each storage device 102 includes a disk processor 1021, a cache 1022, and physical storage space including a plurality of Nand flashes 1023. The disk processor 1021 is configured to: receive an IO request sent by the controller 101, and execute the IO request, to access data from the physical storage space. The cache 1022 is configured to store an application program run by the disk processor 1021. By running the application program, the disk processor 1021 may access and manage data in the storage area 1023.

In this embodiment of the present disclosure, the physical storage space is divided into a plurality of storage areas, each storage area includes at least one storage block, and the storage block is a die constituting a Nand flash.

Figure 3:
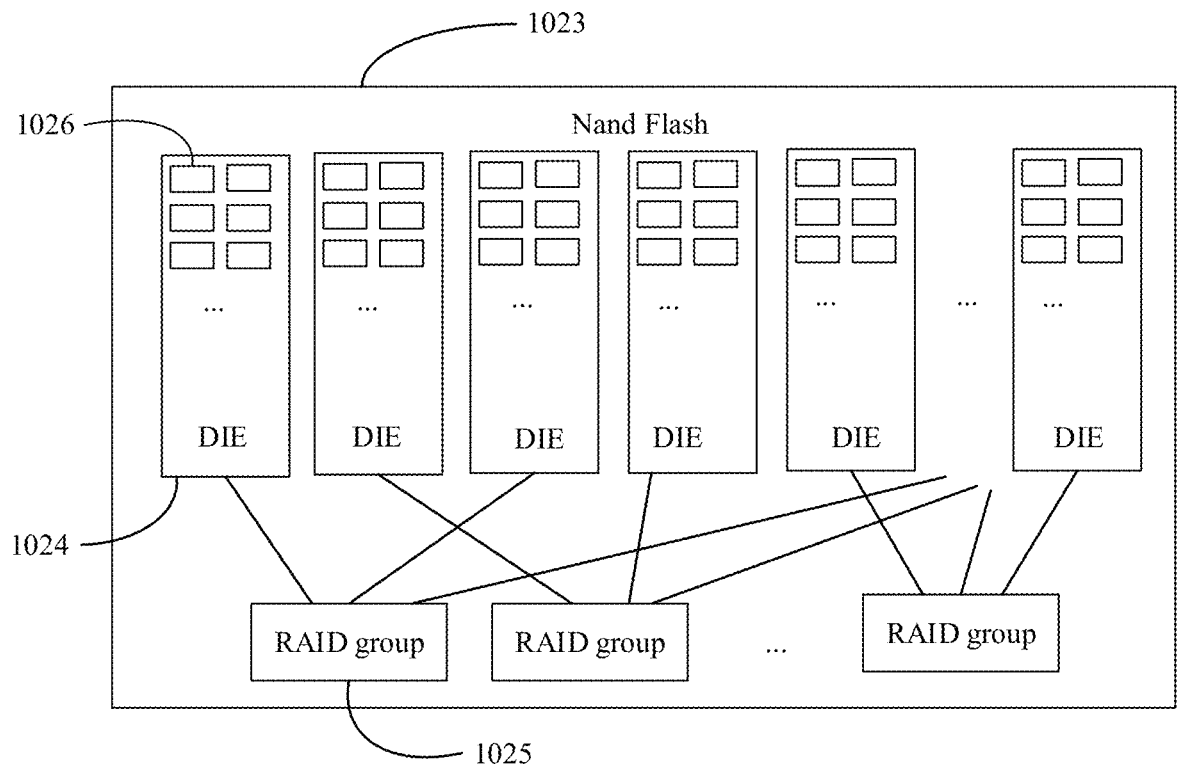
FIG. 3 is a schematic diagram of constructing a storage area at a granularity of a storage block in a storage device according to an embodiment of the present disclosure.

FIG. 3 is a schematic diagram of a RAID including a plurality of dies in a Nand flash in the storage area. Usually, each Nand flash includes a plurality of dies 1024. To ensure data reliability of the storage device 102, a disk array (Redundant Arrays of Independent Drives, RAID) is established in the storage device 102 at a die granularity. For example, each storage device 102 includes 16 Nand flash granularities, each granularity includes four dies, and if every 16 dies constitute one disk array 1025, four RAIDs 1025 may be constructed in the storage device 102. The foregoing quantity of flash granularities included in the storage device 102, the quantity of dies included in each granularity, and the quantity of dies constituting the RAID are all examples for description, and are not used to limit the present disclosure. Each die 1024 includes a plurality of sub-blocks 1026, and each sub-block 1026 is a minimum unit on which an erase operation is performed.

For a storage device 102 whose reliability requirement is not high, no RAID may also be constituted. In this way, each die constitutes a storage area.

In an existing technology, when receiving an IO request sent by the host, the controller 101 sends the IO request to the storage device 102 accessed by the IO request, for processing. After receiving the IO request, the storage device 102 further determines a storage block accessed by the IO request. For IO requests accessing a same storage block, the disk processor 1021 of the storage device 120 sequentially executes the IO requests in an order of the IO requests accessing the die. If a block in the die needs to be erased, an erasure request for erasing the block is added to a queue of to-be-processed requests that corresponds to the die. For example, if in the queue of the to-be-processed requests, a first request is a write request, a second request is an erasure request, and a third request is a read request, the disk processor 1021 first executes a write operation corresponding to the write request, then executes an erase operation corresponding to the erasure request, and finally executes a read operation corresponding to the read request. However, each of a time consumed by the write operation and a time consumed by the erase operation is far longer than that consumed by the read operation. For example, the time consumed by the read operation is usually 80 μs, the time consumed by the write operation is usually 1 ms to 3 ms, and the time consumed by the erase operation is usually 3 ms to 15 ms. In this way, an emergency read request can be executed only after execution of a previous write request or erasure request is completed. Consequently, a delay of the read operation is easily caused. In addition, some operations corresponding to IO requests generated through the operations such as garbage collection and preventive maintenance in the storage device consume a longer time, thereby leading to greater impact on a delay of another relatively emergency IO request, for example, a read request.

In this embodiment of the present disclosure, the controller 101 sets an execution time for the received IO request, and delivers, to the storage device 102, the IO request for which the execution time is set. The storage device 102 adjusts an execution order of the JO request based on the execution time of the IO request, so that an emergency IO request is processed in time, thereby avoiding timeout of the emergency IO request. Solutions provided by the embodiments of the present disclosure are described below in detail with reference to FIG. 4 to FIG. 9.

Figure 4:
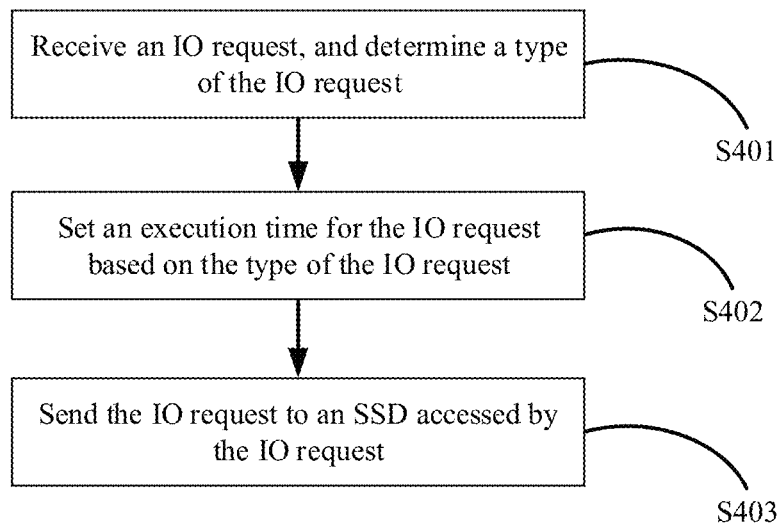
FIG. 4 is a flowchart of a method for processing an IO request by a controller in a server according to an embodiment of the present disclosure.

FIG. 4 is a flowchart of a method for increasing an execution time of an IO request by a controller 101 according to an embodiment of the present disclosure.

Step S401. The controller 101 determines a type of the IO request.

There are generally three types of IO requests. A first type is an IO request generated externally by a server 100, for example, an IO request sent by an external host to the server. There are two types of IO requests generated externally by the server 100. One type is an IO request generated by responding to an operation of a user by the host, and the other type is an IO request corresponding to a value-added service of the server 100, such as snapshooting, cloning, replication, being active-active, and backup. A second type is IO request corresponding to a key service in the server 100, such as reading and writing of metadata. A third type is an IO request corresponding to an array background task, such as cache brushing, hard disk reconstruction, or garbage collection. Each of the three types of IO requests includes two requests, that is, a read request and a write request.

Step S402. The controller 101 sets an execution time for the IO request based on the type of the IO request.

The controller 101 periodically (for example, one minute/one hour/one day) synchronizes a system time in the server 100 to each storage device 102. In this way, synchronization between the time of the server 100 and a time of each storage device 102 can be ensured.

In the server 100, execution duration may be preset for each type of IO request. For example, execution duration set for a read request and execution duration set for a write request that are generated for responding to an operation of a user by the host are respectively 200 μs and 400 μs, execution duration set for a read request and execution duration set for a write request that are generated for reading and writing metadata are respectively 200 µs and 500 µs, execution duration set for a read request and execution duration set for a write request of the metadata are respectively 500 µs and 2 ms, and execution duration set for a read request and execution duration set for a write request that are generated when hard disk reconstruction is performed are respectively 10 ms and 1 s. Execution duration set for a read request and execution duration set for a write request that are generated when garbage collection is performed are respectively 10 ms and 2 s. Similarly, execution duration may also be respectively set for a read request and a write request in snapshooting, cloning, replication, being active-active, and backup in the value-added service. The execution duration of various types of IO requests listed above are merely an example for description, and is not used to limit the present disclosure. During actual application, different execution duration may be set for different IO requests based on an actual case.

When receiving an IO request, and identifying a type of the IO request, the controller 101 obtains, based on the type of the IO request, execution duration set for IO request of the type, and then sets an execution time for the received IO request. The specified execution time is equal to the current system time of the server 100 plus the obtained execution duration of the IO request of the type. An execution time is set for each IO request, so that the storage device executes the IO request based on the execution time in the IO request when executing the IO request. Therefore, an emergency IO request can be processed in time. A specific process in which the storage device executes the IO request based on the execution time is described below.

It should be noted herein that, for a read request in the first type of IO request, if data read for the read request is hit in the memory 103, the data read from the memory is directly returned to the host. For a write request in the first type of IO request, to-be-written data in the write request is written to the memory 103, and a write completion feedback instruction is returned to the host. When the data in the memory 103 is subsequently written to the storage device 102, a new write request is generated, and the generated new IO request belongs to cache brushing in the third type of IO request, and then an execution time is set for the new IO request again.

In this embodiment of the present disclosure, a field is added to the IO request to carry the execution time. FIG. 12 is a schematic diagram of a read request based on an NVMe protocol. The read request includes 64 bytes, and Opcode is a command identifier and is used to identify the command as a read request. In addition, the read request further includes another parameter related to the read request, such as a namespace identifier, a metadata pointer, a memory address used when a pointing disk returns data (Data Pointer), or a starting logical address (Starting LBA). The foregoing parameters are all parameters defined in the existing read command. Details are not described herein again. In addition to the foregoing parameters, some blank positions in the read request are still not defined. For example, none of four bytes in a second command line, four bytes in a third command line, and four bytes in a thirteenth command line are defined. Therefore, in this embodiment of the present disclosure, a byte that can carry the execution time may be randomly selected from these blank bytes. For example, the four bytes in the second command line are selected to carry the execution time.

Optionally, a field is further added to the IO request, the field is used to carry a timeout indication mark, and the timeout indication mark is a mark used to indicate whether returning is immediately performed when a time for completing executing the IO request exceeds the execution time of the IO request. FIG. 12 is still used as an example. In a byte of byte 1 in the read command, a 13th bit in a command line 0 is blank and is still not defined. Therefore, the timeout indication mark may be carried by using the bit. For example, when the timeout indication mark is 0, it indicates that returning does not need to be immediately performed when the time for completing executing the IO request exceeds the execution time of the IO request. When the timeout indication mark is 1, it indicates that returning needs to be immediately performed when the time for completing executing the IO request exceeds the execution time of the IO request. A position at which the timeout indication mark is carried may also be any blank position in an existing read command, and the timeout indication mark may also have different definitions. FIG. 12 is only an example for description. During actual application, a proper position and mark may be selected based on an actual case.

Step S403. The controller 101 sends the IO request to the storage device 102 accessed by the IO request.

The IO request carries a LUN ID and a logical address at which to-be-accessed data is located, and the storage device 102 at which the to-be-accessed data is located may be determined based on the LUN ID and the logical address.

After receiving the IO request, the storage device 102 performs different processing on the read request and the write request. Methods for processing the write request and the read request by the storage device are separately described below.

Figure 5:
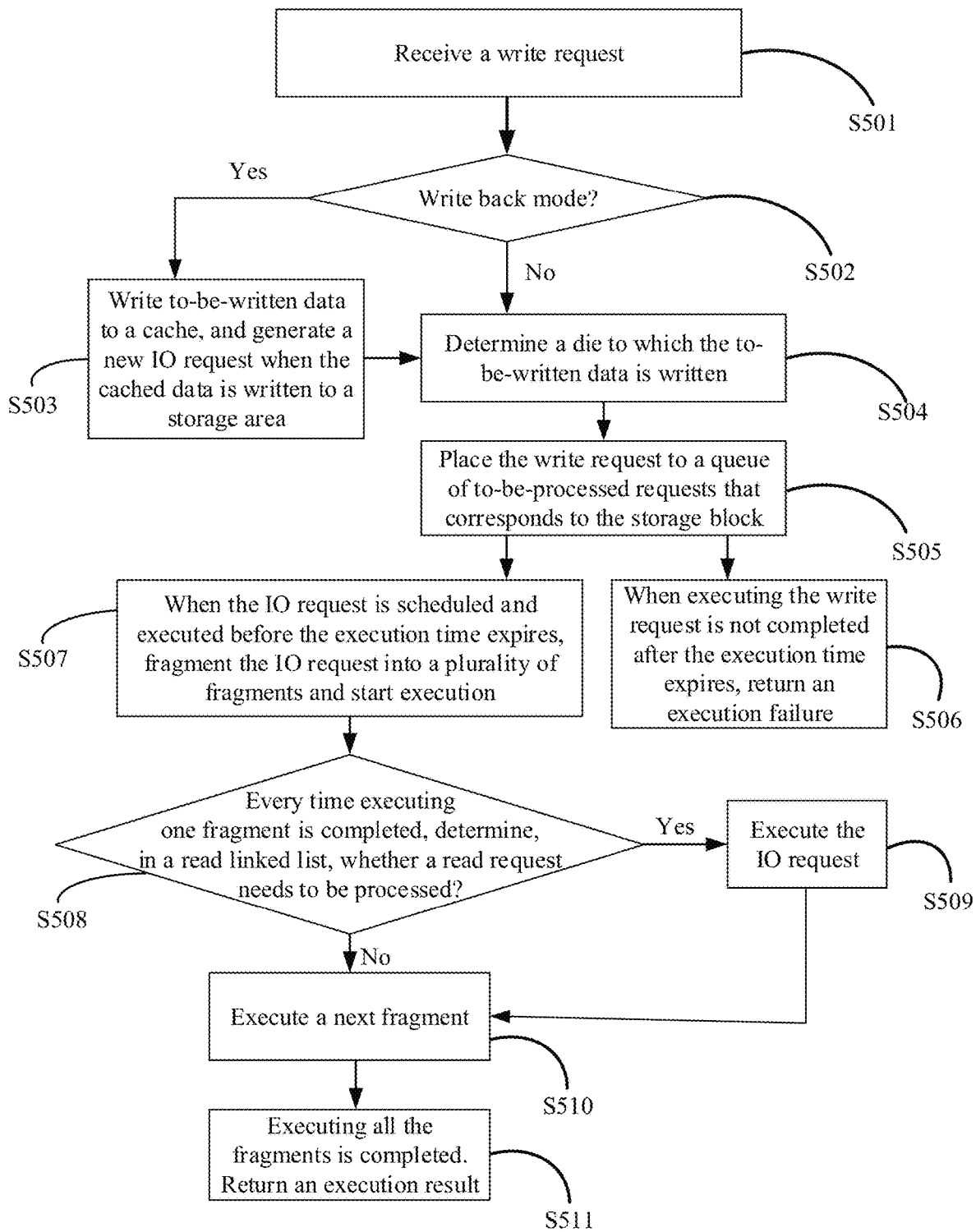
FIG. 5 is a flowchart of processing a received write request by a storage device according to an embodiment of the present disclosure.

FIG. 5 is a flowchart of a method for processing a write request by the storage device 102.

Step S501. A disk processor 1021 of the storage device 102 receives a write request sent by the controller 101.

Step S502. Determine whether a write mode of the storage device 102 is a write-back mode.

Two write modes are usually provided in the storage device 102. One is the write-back mode and the other is a write-through mode. The write-back mode is as follows: The storage device 102 first writes to-be-written data in the write request to the cache 1022, returns a write completion feedback instruction after writing is completed, and subsequently writes the data in the cache 1022 to the Nand flash 1023 through cache brushing. The write-through mode is as follows: The storage device 102 writes the to-be-written data in the write request to both the cache 1022 and the Nand flash 1023. At delivery of the storage device, a manufacturer usually sets the write mode of the storage device, and the write mode is usually set to the write-back mode by default. When a user subsequently needs to change the write mode of the storage device to the write-through mode, the change may be performed by entering a preset command. Whether the write mode of the storage device is the write-back mode or the write-through mode may be obtained by querying a parameter of the storage device.

Step S503. If the write mode of the storage device 102 is the write-back mode, the disk processor 1021 returns the write completion feedback instruction to the controller 101 after writing the to-be-written data in the IO request to the cache 1022.

When the data in the cache 1022 is subsequently written to the storage area, a new write request is generated, and an execution time is set for the new write request again. For setting the execution time, refer to the setting of the execution time of the third type of IO request.

Step S504. The disk processor 1021 determines a storage block to which the to-be-written data of the write request is written.

The write request herein may be a write request that the to-be-written data needs to be written to the Nand flash when it is determined in step S501 that the write mode of the storage device is not the write-back mode but the write-through mode, or may be a write request generated through a background operation of the storage device, such as a write request generated through cache brushing or garbage collection. When the write request is generated in the storage device through a background operation, the disk processor 1021 also sets execution duration for the write request generated through the background operation. For setting the execution duration, refer to the setting of the execution duration of the third type of IO request. When the storage area is the storage area shown in FIG. 3, the disk processor 1021 first determines a storage area to which to-be-written data in the IO request is written, and then determines a storage block to which the to-be-written data is written. However, when there is a single storage block in the storage area, the storage block to which the to-be-written data is written may be directly determined.

Optionally, in this embodiment of the present disclosure, because each of the write operation and the erase operation needs a relatively long time, the write operation and the erase operation are respectively performed in different storage areas. Specifically, when a storage area is selected for the write request, a storage area in which the erase operation is being performed is not selected. Whether the erase operation is being performed in the storage area is recorded in metadata of the storage area. In this way, it can be ensured that the write operation and the erase operation do not occur in a same storage area, thereby avoiding existence of both the write operation and the erase operation in one storage area. When an emergency IO request such as a read request is sorted after the write request and the erasure request, the emergency IO request needs to be completed after the write operation and the erase operation are completed. Consequently, the read request is delayed.

A read operation may be executed in both the storage area in which the write operation is executed and the storage area in which the erase operation is executed. Therefore, in this embodiment of the present disclosure, the storage area has two operation modes: a read+write mode and a read+erase mode. However, when a current operation mode of the storage device 102 cannot implement the case in which the write operation and the erase operation are respectively executed in two storage areas, the operation mode of the storage device may also be converted to a conventional read+write+erase mode. The operation mode of the storage area may be recorded in the metadata of the storage area.

Figure 6:
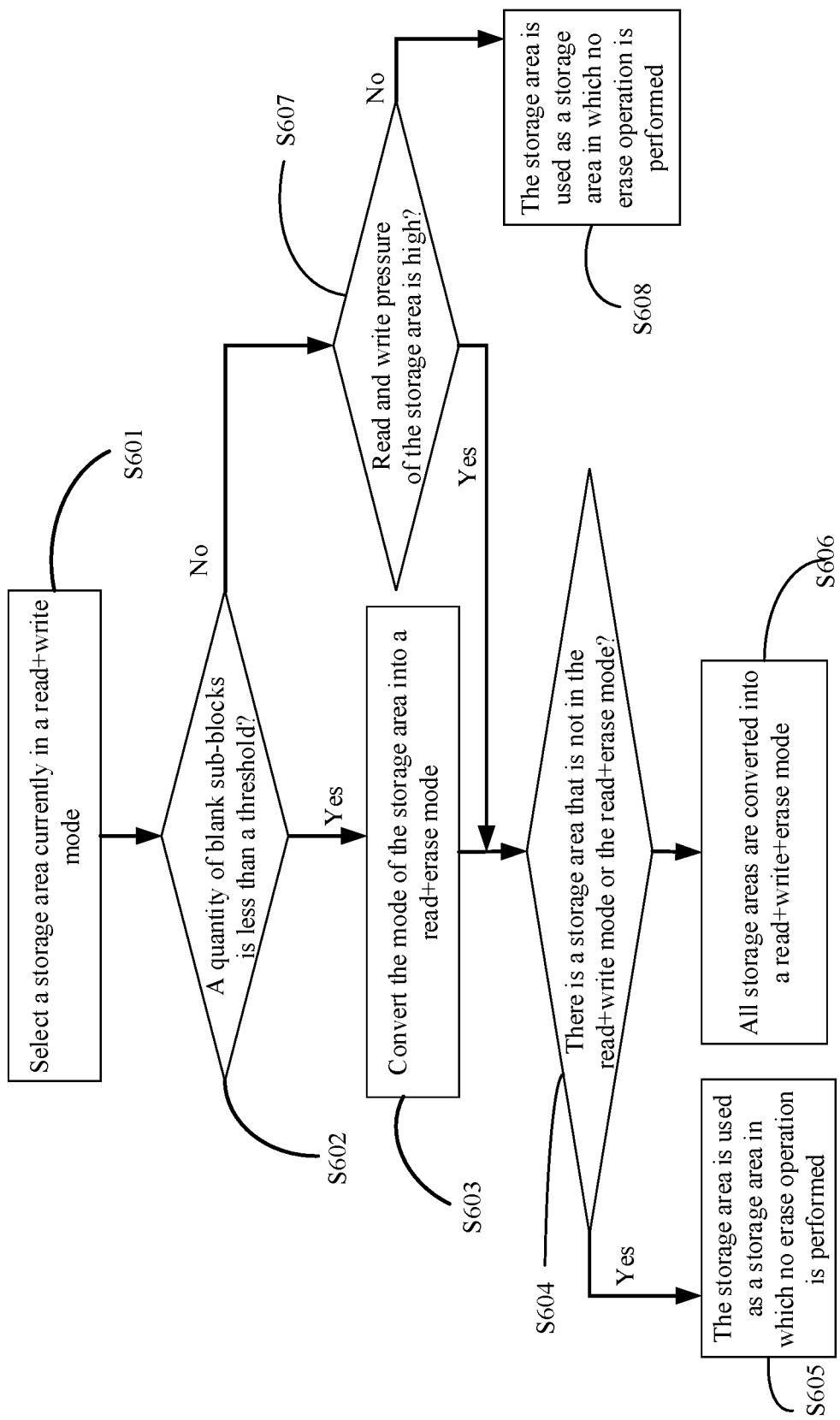
FIG. 6 is a flowchart of a method for determining a storage area to which to-be-written data of a write request is written according to an embodiment of the present disclosure.

How to select, for the write request, a storage area in which no erase operation is executed is described below with reference to FIG. 6

Step S601. The disk processor 1021 selects the storage area in the read+write mode.

Because metadata of each storage area records an operation mode of the storage area, the disk processor 1021 may select the storage area in the read+write mode by querying the operation mode of the storage area recorded in the metadata of each storage area.

Step S602. The disk processor 1021 determines whether a quantity of idle sub-blocks in the selected storage area is less than a threshold. Step S603. If the quantity of idle sub-blocks in the selected storage area is less than the threshold, the disk processor 1021 converts the mode of the storage area to the read+erase mode.

As shown in FIG. 3, each storage area includes a plurality of sub-blocks, the sub-block is a minimum unit on which the erase operation is performed, and as the storage area is continuously operated, there are fewer idle sub-blocks in the storage area. Fewer idle sub-blocks lead to poorer write performance of the storage area. Therefore, in this embodiment of the present disclosure, a smallest threshold for idle sub-blocks is set for each storage area. When the quantity of idle sub-blocks in the storage area is less than the smallest threshold, continuing writing data is not allowed, but the mode of the storage area is converted to the read+erase mode. After the mode of the storage area is converted to the read+erase modes, some sub-blocks with relatively much invalid data are selected and erased from the storage block, to release idle sub-blocks. After the erase operation is executed, if the quantity of idle sub-blocks in the storage area is greater than a value, a mark that the storage area is in the read+erase mode may be cleared for use when the write request is subsequently received.

Step S604. The disk processor 1021 determines whether a storage area that is not in the read+write mode or the read+erase mode exists in storage areas of the storage device.

Step S605. If the storage area that is not in the read+write mode or the read+erase mode exists, the disk processor 1021 uses the storage area as the storage area in which no erase operation is performed.

If the quantity of idle sub-blocks in the selected storage area is less than the threshold, write performance of the storage area is relatively poor, and the storage area cannot be used to write to-be-written data in the write request. In this case, a new storage area needs to be selected for the to-be-written data. When the new storage area is selected, the storage area that is not in the read+write mode or the read+erase mode is selected. In this way, a plurality of storage areas may be enabled to share write pressure.

Step S606. If a storage area that is in the read+write mode and the read+erase mode exists, the disk processor 1021 converts all the storage areas in the storage device into the read+write+erase mode.

If the storage area that is in the read+write mode and the read+erase mode exists, it indicates that the current write pressure of the entire storage device is relatively high. Therefore, the disk processor removes a mark of the read+write mode or the read+erase mode from the metadata of each storage area, so that the storage area is recovered to the existing read+write+erase mode, that is, a read operation, a write operation, and an erase operation may be executed in each storage area.

Step S607. If it is determined in step S602 that the quantity of idle sub-blocks in the selected storage area is not less than the threshold, the disk processor 1021 determines whether read and write pressure of the storage area currently in the read+write mode is excessively high.

In this embodiment of the present disclosure, whether the read and write pressure of the storage area is excessively high may be determined based on whether a read delay of the storage area is greater than a first preset value or whether a write delay is greater than a second preset value.

Step S608. If the read and write pressure of the storage area currently in the read+write mode is excessively high, perform step S604.

If the read delay of the storage area is greater than the first preset value or the write delay is greater than the second preset value, it is considered that the read and write pressure of the storage area is excessively high. The first preset value is twice a delay for processing only one read request by the disk processor 1021 (without interference from another request), and the second preset value is twice a delay for processing only one write request by the disk processor 1021 (without interference from another request).

If the read and write pressure of the storage area currently in the read+write mode is excessively high, the disk processor 1021 determines that the storage area is the storage area in which no erase operation is performed.

If the read delay of the storage area is not greater than the first preset value or the write delay is not greater than the second preset value, it is considered that the read and write pressure of the storage area is not excessively high.

When the storage area in which no erase operation is performed is determined, the to-be-written data may be written to the storage block constituting the storage area. When there is only one storage block in the storage area, the data is directly written to the storage block.

It should be noted that, in another embodiment of the present disclosure, when it is determined in step S602 that the quantity of idle sub-blocks is not less than the threshold, step S608 may be directly performed, in other words, the storage area is used as the storage area to which the write request is written, and step S607 does not need to be performed, in other words, whether the pressure of the storage area is excessively high does not need to be determined.

In another embodiment of the present disclosure, after step S601 is performed, in other words, after the storage area currently in the read+write mode is selected, step S607 is directly performed, in other words, whether the pressure of the storage area is excessively high is determined, and step S602 and step S603 do not need to be performed.

Step S505. Place, based on the execution time of the write request, the write request in a queue of to-be-processed requests that corresponds to the storage block.

In this embodiment of the present disclosure, the queue of to-be-processed requests is a linked list group. However, the linked list group is merely an example for description. Any other queue in which IO requests may be sorted based on execution times belongs to the protection scope of the present disclosure. How to sort the IO requests based on the execution times is described below by using the linked list group as an example.

In this embodiment of the present disclosure, linked list groups corresponding to each storage block include a write linked list group and a read linked list group. In another embodiment, there is no difference between a write linked list group and a read linked list group in the linked list groups corresponding to each storage block, but a read request and a write request are mounted in a same linked list group.

A structure of the write linked list group is the same as a structure of the read linked list group. Only the write linked list group is used as an example below for description.

The write linked list group includes a plurality of write linked lists, a linked list header of each write linked list indicates a time range, there is a time interval between linked list headers of two adjacent write linked lists, and time intervals may be the same or different. In this embodiment, a same time interval is used as an example for description.

Figure 7:
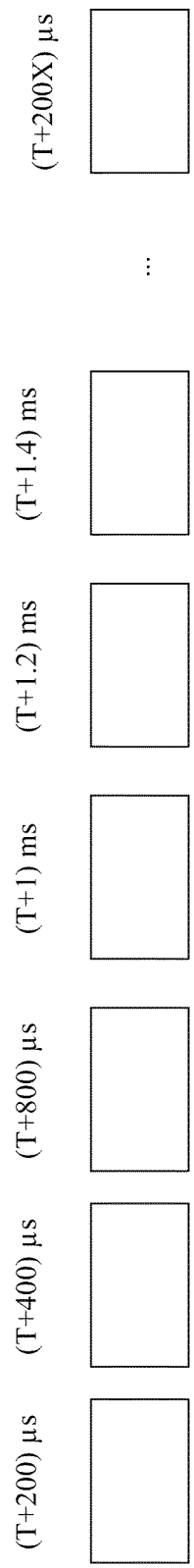
FIG. 7 is a schematic diagram of a first linked list group used to mount an IO request according to an embodiment of the present disclosure.

FIG. 7 is a schematic diagram of a write linked list group according to an embodiment of the present disclosure. A linked list header of a first linked list of the write linked list group is (T+5) ms, and a time range indicated by the linked list header is T ms to (T+5) ms, where T indicates a current system time. A linked list header of a second linked list of the write linked list group is (T+10) ms, and a time range indicated by the linked list header is (T+5) ms to (T+10) ms.

Rest cases can be obtained in the same manner. A difference between time ranges identified by two adjacent linked lists is 5 ms. In this way, a time range within which the execution time falls may be determined based on the execution time of the write request. Therefore, the write request may be mounted in a linked list corresponding to the time range.

Figure 8:
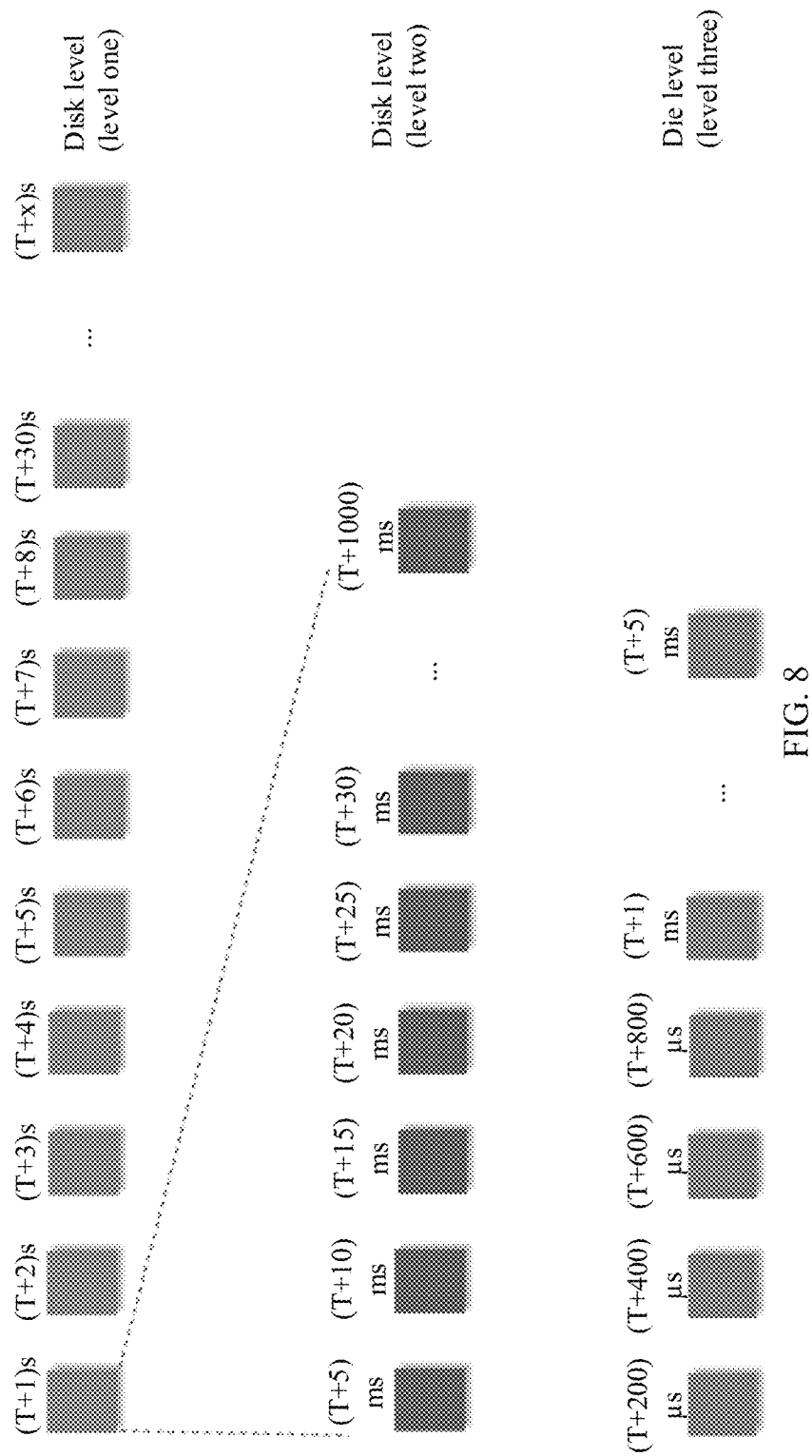
FIG. 8 is a schematic diagram of a second linked list group used to mount an IO request according to an embodiment of the present disclosure.

Optionally, to reduce a quantity of linked lists in a write linked list group and/or a quantity of linked lists in the read linked list group of each die, in this embodiment of the present disclosure, a multi-level linked list group may be established. As shown in FIG. 8, a three-level linked list group is used as an example, where a level-one linked list group and a level-two linked list group are disk-level linked list groups, and a level-three linked list group is a die-level linked list group.

As shown in FIG. 8, the level-one linked list group includes x linked lists, and an interval between time ranges indicated by linked list headers of linked lists in the linked list group is 1 s. Therefore, the quantity x of linked lists is determined by a longest execution time of the write request. A time range indicated by a linked list header (T+1) s of a first linked list is Ts to (T+1)s, and T is a current system time. A time range indicated by a linked list whose linked list header is (T+2)s is (T+1)s to (T+2)s. Rest cases can be obtained in the same manner. Therefore, a time range indicated by a linked list whose linked list header is (T+x)s is (T+x−1)s to (T+x)s.

The level-two linked list group is obtained by further dividing, into a plurality of linked lists, the time range indicated by the linked list header of the first linked list in the level-one linked list group. For example, as shown in FIG. 8, in this embodiment of the present disclosure, a time range indicated by a first linked list in the level-two linked list group is divided by using 5 ms as a granularity.

The level-three linked list is a linked list group corresponding to each die. The level-three linked list group is obtained by further dividing the time range indicated by the linked list header of the first linked list in the level-two linked list group, for example, division is performed by using 200 µs as a granularity.

When the disk processor 1021 needs to write the to-be-written data in the write request to a storage area 1023, the write request is first mounted, based on the execution time in the write request, in a linked list that corresponds to the execution time and that is in the level-one linked list group. For example, if the current system time T is 11 h:25 m:30 s and the execution time of the write request is 11 h:25 m:32 s:66 ms, because the execution time of the write request is T+2 s 65 ms, and a time range to which the execution time belongs is (T+2)s to (T+3)s, the write request is mounted in a third linked list whose linked list header is (T+3)s. As time goes on, when the current system time turns into 11 h:25 m:32 s, the header of the third linked list in the first-level linked list group is (T+1)s, that is, turns into the first linked list in the level-one linked list group, and the execution time of the write request mounted in the third linked list turns into (T+65) ms, the disk processor 1021 mounts, in each linked list of the level-two linked list group, a write request mounted in the first linked list. For example, a write request whose execution time is (T+66) ms is mounted in a linked list whose linked list header is (T+70) ms. Similarly, as time goes on, when the current system time T turns into 11 h:25 m:32 s:65 ms, the linked list header of the linked list whose linked list header is (T+70) ms turns into (T+5) ms, and the write request whose execution time is (T+66) ms also turns into (T+1) ms. In this way, the disk processor mounts, in the level-three linked list group based on the execution time, the write request mounted in the linked list header (T+5) ms. For example, the write request whose execution time is (T+1) ms is mounted in a linked list whose linked list header is (T+1) ms. In this way, the disk processor 1021 may execute write requests in the linked list based on an order of execution times of the write requests in the linked list group corresponding to the die.

The write linked list and the read linked list are merely an example for description. During specific implementation, the write linked list and the read linked list may also not differentiated, but the read request and the write request are mounted in one linked list. The disk process may differentiate the read request and the write request based on the type of the IO request in the linked list.

Step S506. When it is determined that executing the write request cannot be completed after the execution time of the write request expires, and a timeout indication mark carried in the write request is a mark indicating whether returning is immediately performed when a time for completing executing the write request exceeds the execution time of the IO request, execution failure feedback information is sent to the controller 101.

Step S507. When executing the write request before the execution time of the write request expires, the disk processor 1021 fragments the write request into a plurality of fragments. In this embodiment of the present disclosure, before the execution time of the write request expires, it indicates that a current time is earlier than the execution time of the write request minus the execution duration of the write request. In this way, it can be ensured that executing the write request can be completed before the execution time expires.

Assuming that a time consumed for executing the write request is 2 ms, and a time for executing one read request is usually 80 μs, the disk processor 1021 fragments the write request by using 100 μs as a granularity before executing the write request.

Step S508. Every time executing a fragment of a write request is completed, the disk processor 1021 determines, in the read linked list corresponding to the storage block, whether an emergency read request needs to be processed.

In this embodiment of the present disclosure, the emergency read request is a read request whose execution time is earlier than the execution time of the write request, or a read request whose execution time is earlier than a current time plus execution duration of a next fragment of the write request and execution duration of the read request, or a read request whose execution time is earlier than a current system time plus execution duration of a next fragment plus execution duration of x read requests, and x is a maximum quantity of read requests on which serial execution is allowed when executing the write request is paused once.

Step S509. If the emergency read request needs to be processed, pause executing the write request, and execute the read request; after executing the read request is completed, continue executing a next fragment of the write request.

Step S510. If no emergency read request needs to be processed, continue executing a next fragment of the write request.

Step S511. If executing the write request is successfully completed, return an execution result to the controller 101.

Figure 9:
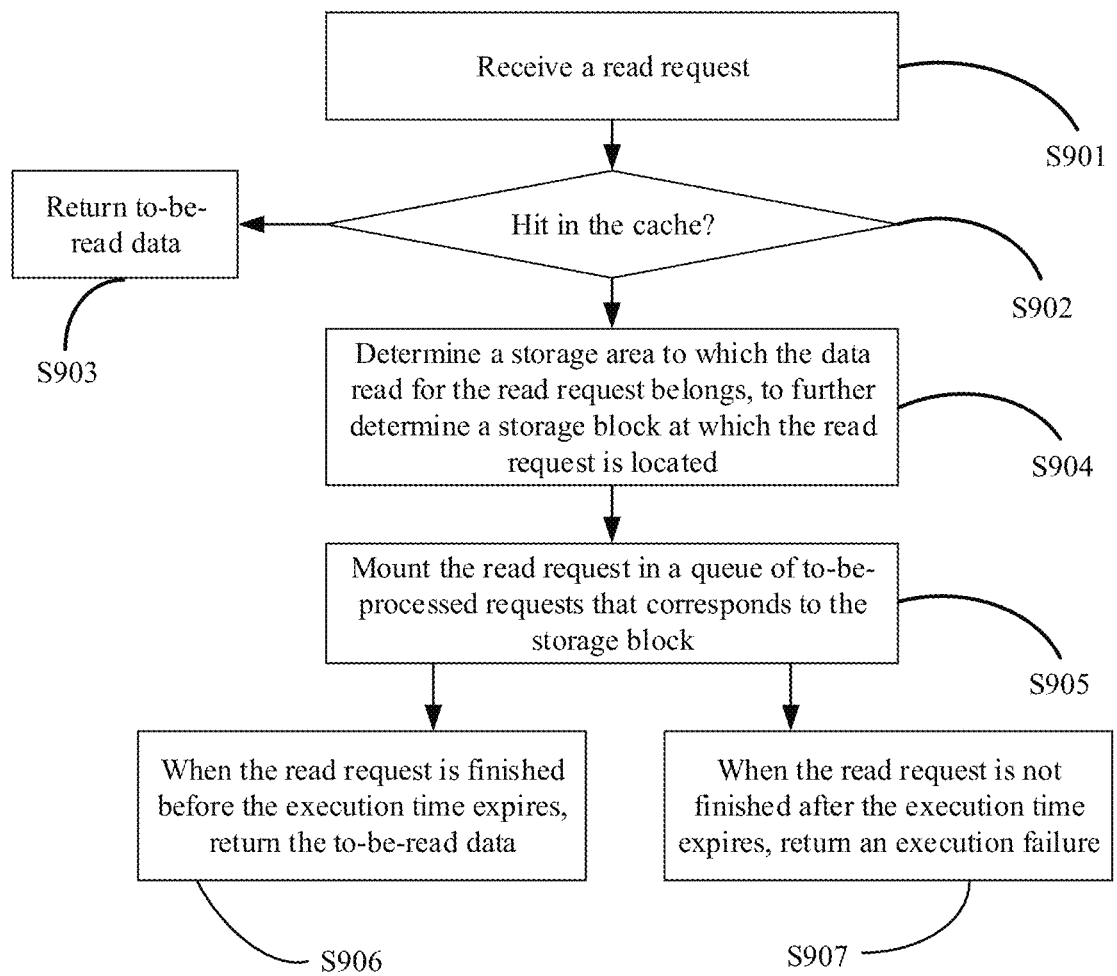
FIG. 9 is a flowchart of processing a received read request by a storage device according to an embodiment of the present disclosure.

FIG. 9 is a flowchart of a method for processing a read request by the storage device 102.

Step S901. The disk processor 1021 receives the read request.

Step S902. The disk processor 1021 determines whether to-be-read data of the read request is hit in the cache 1022.

To increase read and write efficiency, frequently accessed hot data and newly written data are cached in the cache 1022. Therefore, when receiving the read request, the disk processor first checks, in the cache based on a logical address carried in the read request, whether the to-be-read data is stored in the cache, in other words, determines whether the to-be-read data of the read request is hit in the cache 1022.

Step S903. If the to-be-read data of the read request is hit, return the to-be-read data to the controller 101.

If the to-be-read data is in the cache, in other words, it indicates that the to-be-read data is hit in the cache, the to-be-read data in the cache is returned to the controller 101.

Step S904. If the to-be-read data of the read request is missed, determine a storage area to which the data read for the read request belongs, to further determine a storage block at which the read request is located.

If the to-be-read data is missed in the cache 1022, the to-be-read data needs to be read from the physical storage area 1023. When the to-be-read data is read, the storage area in which the to-be-read data is located needs to be first determined based on a logical address of the read request. If the storage area is a RAID including a plurality of storage blocks, a storage block at which the read request is located may be further determined. If the storage area includes one storage block, the determined storage area is the storage block.

Step S905. Mount the read request in a queue of to-be-processed requests that corresponds to the storage block.

In this embodiment of the present disclosure, the queue of the to-be-processed requests is implemented in a form of a linked list group, and each storage block corresponds to one read linked list group and one write linked list group. However, in another implementation, the read linked list group and the write linked list group may also form one linked list group. A structure of the read linked list group is the same as a structure of the write linked list group. For details, refer to the related descriptions in FIG. 7 and FIG. 8. In this embodiment of the present disclosure, the queue of the to-be-processed requests is described by only using the linked list group as an example. However, during actual application, another manner in which 10 requests may be sorted based on execution times belongs to the protection scope of the present disclosure.

Step S906. If the read request is executed before an execution time of the read request expires, the read data is returned to the controller after the read request is completed.

Step S907. If the read request is not finished after the execution time of the read request expires, and the timeout indication mark carried in the read request indicates that returning is immediately performed when the read request is not executed after the execution time of the read request expires, feedback information of execution failure is returned to the controller 101. After receiving the feedback information of execution failure, the controller 101 may re-read the read request. If the IO request carries a timeout indication mark that is a mar indicating that no error is returned when a time for executing the IO request exceeds the execution time of the IO request, the storage device 102 does not process the read request; and when the host determines that the IO request times out, re-sends the read request.

In this embodiment of the present disclosure, to enable the read request to be processed as soon as possible, if an operation mode of the storage area in which the to-be-read data of the read request is located is a read+write mode, the disk processor schedules the read request in a process of executing the write request. For details, refer to the descriptions in steps S507 and S508 in FIG. 5.

If the operation mode of the storage area in which the to-be-read data of the read request is located is a read+erase mode, the disk processor schedules the read request in a process of executing the erase operation. A specific method is as follows: It is assumed that one read operation consumes 80 μs, one erase operation needs to consume 10 ms, the erase operation is fragmented into 50 fragments, and each fragment corresponds to 200 μs. At an interval of 200 μs, the disk processor determines whether the erase operation needs to be paused in response to an emergency read request; if there is an emergency read request, executes the read request; and after executing the emergency read request is completed, then executes a next fragment. The emergency read request is a read request whose execution time is earlier than an execution time of the erasure request, or a read request whose execution time is earlier than a current time plus execution duration of a next fragment of the erasure request, or a read request whose execution time is earlier than a current system time plus execution duration of a next fragment of the erasure request plus execution duration of x read requests, and x is a maximum quantity of read requests allowed to be executed serially once the execution of the write request is paused.

Figure 10:
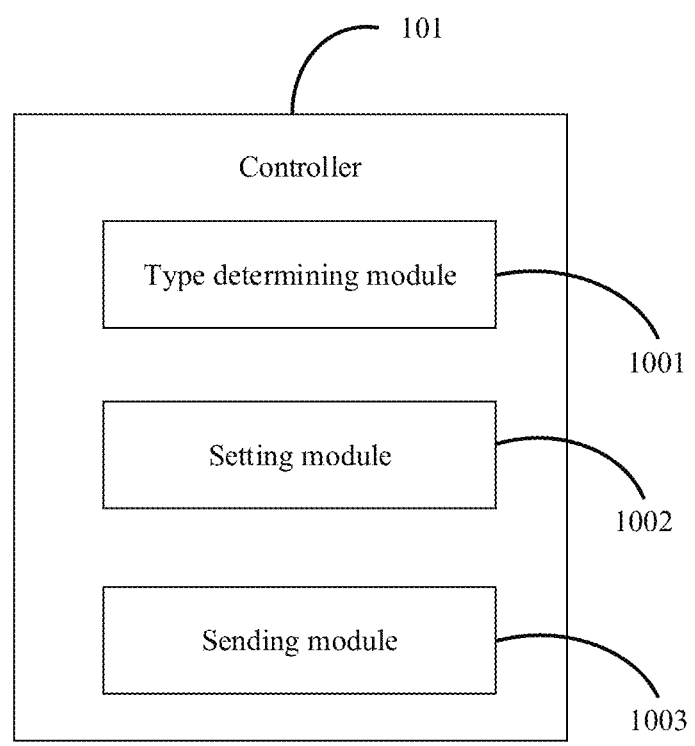
FIG. 10 is a diagram of function modules in a controller according to an embodiment of the present disclosure.

FIG. 10 is a schematic structural diagram of a controller according to an embodiment of the present disclosure. In a specific example, the controller may be the controller 101 in FIG. 1.

In a specific embodiment, the controller 101 includes a type determining module 1001, a setting module 1002, and a sending module 1003. The type determining module 1001 is configured to determine a type of an IO request. For a manner of determining the type of the IO request by the controller and types of IO requests, refer to the descriptions in step S401 in FIG. 4.

The setting module 1002 is configured to set an execution time for the IO request based on the type of the IO request. For a manner of setting an execution time for each IO request by the setting module 1002, refer to the related descriptions in step S402.

Optionally, the setting module 1002 adds a field to the IO request to carry the execution time. In addition, the setting module 1002 further adds a field to the IO request, the field is used to carry a timeout indication mark, and the timeout indication mark is a mark used to indicate whether returning is immediately performed when a time for executing the IO request exceeds the execution time of the IO request.

The sending module 1003 is configured to send the IO request to a storage device 102 accessed by the IO request. The function executed by the sending module 1003 corresponds to step S403 in FIG. 4. Refer to the related descriptions in step S403 in FIG. 4.

In another embodiment of the present disclosure, the controller 101 may also include only the setting module 1002 and the sending module 1003.

Figure 11:
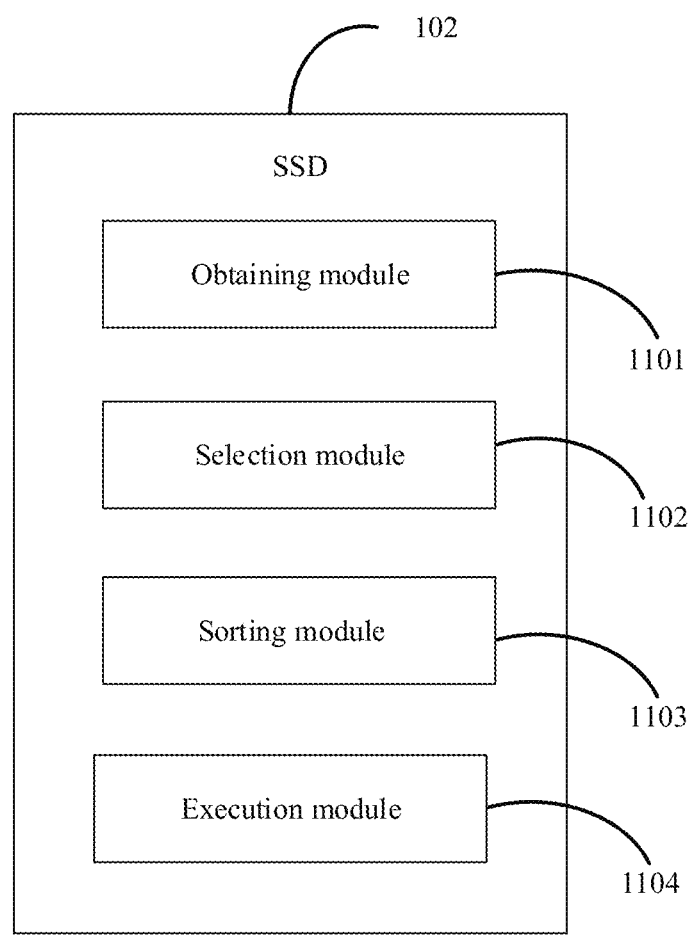
FIG. 11 is a diagram of function modules in a storage device according to an embodiment of the present disclosure.

FIG. 11 is a schematic structural diagram of a storage device according to an embodiment of the present disclosure. In a specific example, the storage device may be the storage device 102 in FIG. 1 and FIG. 2.

In a specific embodiment, the storage device includes an obtaining module 1101 and an execution module 1103.

The obtaining module 1101 is configured to obtain an IO request, the IO request may be an IO request received from a controller 101, or may be an IO request generated through a background operation of the storage device, such as cache brushing, or an IO request generated through garbage collection. When the IO request is a write request, the obtaining module 1101 further determines whether a write mode of the storage device 102 is a write-back mode. If the write mode of the storage device 102 is the write-back mode, the obtaining module 1101 returns a write completion feedback instruction to the controller 101 after writing to-be-written data in the IO request to a cache 1022. When the IO request is a read request, the obtaining module determines whether the read request is hit in the cache 1022; and if the read request is hit in the cache 1022, returns a read hit feedback instruction to the controller 101. For the function executed by the obtaining module 1101, refer to the descriptions in steps S501 to S503 in FIG. 5 and steps S901 to S903 in FIG. 9.

The execution module 1104 is configured to execute the IO request based on the execution time of the IO request. When the IO request is the write request, when the execution module 1104 determines that executing the write request cannot be completed after the execution time of the write request expires, and a timeout indication mark carried in the write request is a mark indicating that returning is immediately performed when a time for executing the write request exceeds the execution time of the IO request, the execution module 1104 returns execution failure feedback information to the controller 101. When the write request is executed before the execution time expires, the write request is fragmented into a plurality of fragments. Every time the execution module 1103 completes executing one fragment of the write request, the execution module 1103 determines, in a read linked list corresponding to a storage block, whether an emergency read request needs to be processed. If the emergency read request needs to be processed, executing the write request is paused, and the read request is executed. After executing the read request is completed, the execution module 1103 continues executing a next fragment of the write request. If no emergency read request needs to be processed, the execution module 1103 continues executing a next fragment of the write request. If executing the write request is successfully completed, an execution result is returned to the controller. The function executed by the execution module 1103 is the same as the function executed in steps S506 to S511 in FIG. 5. For details, refer to steps S506 to S511 in FIG. 5. When the IO request is the read request, before the execution time of the read request expires, the execution module 1103 completes executing the read request, and returns data that is read to the controller 101. If executing the read request is not completed when the execution time expires, if the timeout indication mark carried in the IO request is a mark indicating that a time for executing the IO request exceeds the execution time of the IO request, the execution module 1103 returns an execution error to the controller 101. After receiving execution error feedback information, the controller 101 may re-read the read request. If the timeout indication mark carried in the IO request is a mark indicating that no error is returned when the time for executing the IO request exceeds the execution time of the IO request, the storage device 102 does not process the read request; and when the host determines that the IO times out, re-sends the read request. For details, refer to the descriptions in steps S906 and S907 in FIG. 9.

When executing an erasure request, the execution module 1104 fragments the erasure request into a plurality of fragments. Every time executing one fragment is completed, the execution module 1104 determines whether an erase operation needs to be paused in response to an emergency read request; if there is an emergency read request, executes the read request; and after executing the emergency read request is completed, then executes a next fragment. The emergency read request is a read request whose execution time is earlier than an execution time of the erasure request, or a read request whose execution time is earlier than a current time plus execution duration of a next fragment of the erasure request, or a read request whose execution time is earlier than a current system time plus execution duration of a next fragment of the erasure request plus execution duration of x read requests, and x is a maximum quantity of read requests on which serial execution is allowed when executing the write request is paused once.

In another embodiment, the storage device further includes a selection module 1102. The selection module 1102 is configured to determine a storage block at which the IO request is operated. When the IO request is a write request, for a method for determining the operated storage block by the selection module 1102, refer to the related descriptions in step S504 in FIG. 5 and FIG. 6. When the IO request is a read request, refer to the related descriptions in step S904 in FIG. 9.

In another embodiment, based on the foregoing embodiment, the storage device 102 further includes a sorting module 1103. The sorting module is configured to: after the storage block at which the IO request is operated is determined, insert, based on the execution time of the IO request, the IO request into an IO queue corresponding to the storage block. In this embodiment of the present disclosure, the IO queue is a linked list group. For a form of the linked list group, refer to the descriptions in FIG. 7 and FIG. 8. The function executed by the sorting module 1103 is the same as the function executed in step S505 in FIG. 5 and the function executed in step S905 in FIG. 9. For details, refer to the related descriptions in step S505 in FIG. 5 and step S905 in FIG. 9

Continuously referring to FIG. 11, the present disclosure provides an embodiment of another storage device. The storage device in this embodiment includes an obtaining module 1101, a selection module 1102, and an execution module 1104.

The obtaining module 1101 is configured to receive a write request, where the write request carries to-be-written data. The selection module 1102 is configured to select a storage area in which no erase operation is performed from a plurality of storage areas. When an IO request is a write request, for a method for determining an operated storage block by the selection module 1102, refer to the related descriptions in step S504 in FIG. 5 and FIG. 6. When an IO request is a read request, refer to the related descriptions in step S904 in FIG. 9. The execution module 1104 is configured to write the to-be-written data to the selected storage area. For details, refer to the related descriptions in steps S506 to S511 in FIG. 5 and steps S906 and S907 in FIG. 9.

In this embodiment of the present disclosure, the controller 101 further includes a processor and a memory, the memory may be a cache, and the cache is configured to store a control instruction.

The processor is configured to: obtain an IO request, and add an execution time of the IO request to the IO request, where the execution time is used to instruct the storage device to complete processing the IO request before the execution time expires; and send the IO request to the storage device. For a specific manner of performing the foregoing processing by the processor, refer to the detailed descriptions in the embodiment corresponding to FIG. 4. It may be understood that, in another implementation, the control instruction may be stored in a memory 103 of a server, and the processor may read the control instruction in the memory 103, and then perform the foregoing processing.

It should be noted that the modules in the foregoing embodiment may be implemented by software, hardware, or a combination of the two. When any one of the foregoing modules or units is implemented by software, the software exists in a form of a computer program instruction, and is stored in the memory. The processor may be configured to execute the program instruction and implement the foregoing method procedure. The processor may include, but is not limited to, at least one of the following types of computing devices in running software: a central processing unit (CPU), a microprocessor, a digital signal processor (DSP), a microcontroller unit (MCU), or an artificial intelligence processor. Each computing device may include one or more cores used to execute a software instruction to perform calculation or processing. The processor may be built in an SoC (system on a chip) or an application specific integrated circuit (ASIC), or may be an independent semiconductor chip. In addition to the cores used to execute the software instruction to perform calculation or processing, the processor may further include a necessary hardware accelerator, such as a field programmable gate array (FPGA), a PLD (programmable logic device), or a logic circuit implementing dedicated logical operation.

When the foregoing modules or units are implemented by hardware, the hardware may be any one of or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, and may run necessary software or not depend on software to execute the foregoing method procedure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, the method comprising:
adding, by a controller, an execution time to an IO request, wherein the execution time is used to instruct a storage device to complete the IO request before the execution time expires; and
sending, by the controller, the IO request to the storage device;
executing, by the storage device, the IO request based on the execution time of the IO request;
determining, by the controller, a type of the IO request;
wherein there are three types of the IO requests: a first type is an IO request generated externally by the server including the following types of an IO request generated by responding to an operation of a user by a host and an IO request corresponding to a value-added service of the server including snapshooting, cloning, replication being active-active and backup; a second type is an IO request correspond to a key service in the server including reading and writing of metadata; and a third type is an IO request corresponding to an array background task including cache brushing, hard disk reconstruction, and garbage collection; and determining, by the controller, the execution time of the IO request based on the type of the IO request, wherein the storage device comprises a plurality of storage areas, each storage area comprises at least one storage block, the IO request is a write request, and the determining a storage block accessed by the IO request comprises:
  selecting, by the storage device, a storage area in which no erase operation is performed from the plurality of storage areas; and
  determining, by the storage device and based on the selected storage area, the storage block accessed by the IO request, and
  wherein each storage block comprises a plurality of sub-blocks, each sub-block is a minimum unit on which the erase operation is performed, each storage area supports a read+write mode and a read+erase mode, and when the storage area is used to write data, the storage area is set to the read+write mode; when the storage area is used to perform the erase operation, the storage area is set to the read+erase mode; and the selecting a storage area in which no erase operation is performed from the plurality of storage areas comprises:
  selecting a storage area in the read+write mode from the plurality of storage areas;
  determining whether a quantity of idle sub-blocks in the selected storage area is less than a threshold; and
  when the quantity of idle sub-blocks in the selected storage area is not less than the threshold, using the selected storage area in the read+write mode as the storage area in which no erase operation is performed.

2. The method according to claim 1, wherein the method further comprises:
  adding, by the controller, a timeout indication mark to the IO request, wherein the timeout indication mark is used to indicate whether the storage device returns a mark of error information when the IO request is not completed by the storage device after the execution time times out, and the error information is used to indicate that the IO request failed to execute.

3. The method according to claim 1, wherein the storage device comprises a plurality of storage blocks, and the method further comprises:
  after obtaining the IO request, determining, by the storage device, a storage block accessed by the IO request;
  placing, by the storage device and based on the execution time, the IO request in a queue of to-be-processed requests that corresponds to the storage block.

4. The method according to claim 1, wherein each storage block comprises a plurality of sub-blocks, each sub-block is a minimum unit on which the erase operation is performed, each storage area supports a read+write mode and a read+erase mode, and when the storage area is used to write data, the storage area is set to the read+write mode; when the storage area is used to perform an erase operation, the storage area is set to the read+erase mode; and the determining a storage block accessed by the IO request comprises:
  selecting a storage area in the read+write mode from the plurality of storage areas;
  determining whether read and write pressure undertaken by the selected storage area exceeds a threshold; and
  when the read and write pressure undertaken by the selected storage area does not exceed the threshold, using the selected storage area as the storage area in which no erase operation is performed.

5. The method according to claim 1, wherein the method further comprises:
  fragmenting, into a plurality of fragments, a write request or an erasure request needing to be executed;
  after completing executing one fragment, determining whether an emergency read request needs to be processed, wherein the emergency read request is a read request whose execution time is earlier than an execution time of the write request or an execution time of the erasure request; and
  if the emergency read request needs to be processed, pausing executing the write request or the erasure request, and executing the emergency read request.

6. The method according to claim 1, wherein the method further comprises: fragmenting, into a plurality of fragments, a write request or an erasure request needing to be executed;
  after completing executing one fragment, determining whether an emergency read request needs to be processed, wherein the emergency read request is a read request whose execution time is earlier than an execution time of a next fragment plus execution duration of x serially executed read requests, and x is a maximum quantity of read requests which are serially executed once the write request or the erasure request is paused; and
  if the emergency read request needs to be processed, mounting the write request or the erasure request, and executing the emergency read request.

7. A storage device, comprising:
  a processor; and
  a non-transitory memory coupled to the processor and storing programming instructions for execution by the processor, the programming instructions instruct the processor to:
  receive an IO request, wherein the IO request comprises an execution time, and the execution time is used to instruct the storage device to complete processing the IO request before the execution time expires;
  execute the IO request based on the execution time of the IO request;
  determining a type of the IO request;
  wherein there are three types of the IO requests: a first type is an IO request generated externally by the server including the following types of an IO request generated by responding to an operation of a user by a host and an IO request corresponding to a value-added service of the server including snapshooting, cloning, replication being active-active and backup; a second type is an IO request correspond to a key service in the server including reading and writing of metadata; and a third type is an IO request corresponding to an array background task including cache brushing, hard disk reconstruction, and garbage collection;
  determining the execution time of the IO request based on the type of the IO request
  wherein the storage device comprises a plurality of storage areas, each storage area comprises at least one storage block, the IO request is a write request, and when determining the storage block accessed by the IO request, the programming instructions further instructs the processor to:
  select a storage area in which no erase operation is performed from the plurality of storage areas; and determine, based on the selected storage area, the storage block accessed by the IO request, and wherein each storage block comprises a plurality of sub-blocks, the sub-block is a minimum unit on which the erase operation is performed, each storage area comprises a read+write mode and a read+erase mode, and when the storage area is used to write data, the storage area is set to the read+write mode; when the storage area is used to perform the erase operation, the storage area is set to the read+erase mode; and when selecting the storage area in which no erase operation is performed from the plurality of storage areas, the programming instructions further instructs the processor to:

select a storage area in the read+write mode from the plurality of storage areas;

determine whether a quantity of idle sub-blocks in the selected storage area is less than a threshold; and when the quantity of idle sub-blocks in the storage area selected by the selection module is not less than the threshold, use the selected storage area in the read+write mode as the storage area in which no erase operation is performed.

8. The storage device according to claim 7, wherein the storage device further comprises a plurality of storage blocks, and the programming instructions further instructs the processor to;

determine a storage block accessed by the TO request after obtaining the TO request; and place, based on the execution time, the TO request in a queue of to-be-processed requests that corresponds to the storage block.

9. The storage device according to claim 8, wherein when executing a write request or an erasure request, the programming instructions further instructs the processor to:

fragment, into a plurality of fragments, the write request or the erasure request needing to be executed;

after completing executing one fragment, determine whether an emergency read request needs to be processed, wherein the emergency read request is a read request whose execution time is earlier than a current time plus execution duration of a next fragment plus execution duration of x serially executed read requests, and x is a maximum quantity of read requests on which serial execution is allowed when executing the write request or the erasure request is paused once; and if the emergency read request needs to be processed, pause executing the write request or the erasure request, and execute the emergency read request.

10. The storage device according to claim 7, wherein when executing a write request or an erasure request, the programming instructions further instructs the processor to:

fragment, into a plurality of fragments, the write request or the erasure request needing to be executed;

after completing executing one fragment, determine whether an emergency read request needs to be processed, wherein the emergency read request is a read request whose execution time is earlier than a current time plus execution duration of a next fragment; and if the emergency read request needs to be processed, pause executing the write request or the erasure request, and execute the emergency read request.

11. A data processing system, comprising:

a controller, configured to add an execution time to the IO request, wherein the execution time is used to instruct a storage device to complete processing the IO request before the execution time expires; and send the IO request to the storage device; and the storage device, configured to receive the IO request, and execute the IO request based on the execution time of the IO request;

the controller, further configured to determine a type of the IO request;

wherein there are three types of the IO requests: a first type is an IO request generated externally by the server including the following types of an IO request generated by responding to an operation of a user by a host and an IO request corresponding to a value-added service of the server including snapshooting, cloning, replication being active-active and backup; a second type is an IO request correspond to a key service in the server including reading and writing of metadata; and a third type is an IO request corresponding to an array background task including cache brushing, hard disk reconstruction, and garbage collection; and determine the execution time of the IO request based on the type of the IO request, wherein the storage device comprises a plurality of storage areas, each storage area comprises at least one storage block, the IO request is a write request, and when determining the storage block accessed by the IO request, the controller is further configured to:

select a storage area in which no erase operation is performed from the plurality of storage areas; and determine, based on the selected storage area, the storage block accessed by the IO request, and wherein each storage block comprises a plurality of sub-blocks, the sub-block is a minimum unit on which the erase operation is performed, each storage area comprises a read+write mode and a read+erase mode, and when the storage area is used to write data, the storage area is set to the read+write mode; when the storage area is used to perform the erase operation, the storage area is set to the read+erase mode; and when selecting the storage area in which no erase operation is performed from the plurality of storage areas, the controller is further configured to:

select a storage area in the read+write mode from the plurality of storage areas;

determine whether a quantity of idle sub-blocks in the selected storage area is less than a threshold; and when the quantity of idle sub-blocks in the storage area selected by the selection module is not less than the threshold, use the selected storage area in the read+write mode as the storage area in which no erase operation is performed.

12. The system according to claim 11, wherein the controller is further configured to:

add a timeout indication mark to the IO request, wherein the timeout indication mark is used to indicate whether the storage device returns a mark of error information when the IO request is not completed by the storage device after the execution time times out, and the error information is used to indicate that the IO request failed to execute.

13. The system according to claim 11, wherein the storage device comprises a plurality of storage blocks, and the storage device is further configured to:

determine a storage block accessed by the IO request after receiving the IO request;

place, based on the execution time, the IO request in a queue of to-be-processed requests that corresponds to the storage block.

\* \* \* \* \*

UNITED STATES PATENT AND TRADEMARK OFFICE
CERTIFICATE OF CORRECTION

PATENT NO. : 11,954,332 B2
APPLICATION NO. : 17/347041
DATED : April 9, 2024
INVENTOR(S) : Wu et al.

It is certified that error appears in the above-identified patent and that said Letters Patent is hereby corrected as shown below:

On the Title Page

(56) References Cited, Other Publications, Right-Hand Column, Line 3: "Storage Systems and Technologies (MSST), IEEE, XP03308503," should read -- Storage Systems and Technologies (MSST), IEEE, XP033085030, --.

(56) References Cited, Other Publications, Right-Hand Column, Line 5: "York, New York (May 2, 2016). XP033085030." should read -- York, New York (May 2, 2016). --.

Page 2: (56) References Cited, Foreign Patent Documents, Left-Hand Column, Line 6: "IN 105677744 A 6/2016" should read -- CN 105677744 A 6/2016 --.

Page 2: (56) References Cited, Other Publications, Left-Hand Column, Line 5: "2009). Organization." should read -- 2009). --.

In the Claims

Claim 8: Column 25, Lines 29-31: "determine a storage block accessed by the TO request after obtaining the TO request; and place, based on the execution time, the TO request in a" should read -- determine a storage block accessed by the IO request after obtaining the IO request; and place, based on the execution time, the IO request in a --.

Signed and Sealed this
Sixth Day of August, 2024

Katherine Kelly Vidal
*Director of the United States Patent and Trademark Office*